United States Patent [19]

Wakahara

[11] 3,914,036
[45] Oct. 21, 1975

[54] FILM FRAME FEED DEVICE IN A COMPACT MOTION PICTURE PROJECTOR

[75] Inventor: Shigeo Wakahara, Yokohama, Japan

[73] Assignee: Nippon Kogaku K.K., Tokyo, Japan

[22] Filed: June 13, 1974

[21] Appl. No.: 479,110

[30] Foreign Application Priority Data
June 20, 1973 Japan.............................. 48-73354

[52] U.S. Cl. ................... 352/194; 352/169; 226/62
[51] Int. Cl.² ........................................... G03B 1/22
[58] Field of Search ........... 352/169, 194, 196, 174, 352/180; 226/62, 70, 71, 72

[56] References Cited
UNITED STATES PATENTS

| | | | |
|---|---|---|---|
| 1,943,303 | 1/1934 | Foster | 352/169 X |
| 3,261,654 | 7/1966 | Faber | 352/169 X |
| 3,397,937 | 8/1968 | Schrader | 352/169 |

Primary Examiner—Monroe H. Hayes
Attorney, Agent, or Firm—Fitzpatrick, Cella, Harper & Scinto

[57] ABSTRACT

In a compact motion picture projector, a film frame feed device includes a film feed pawl, drive means for the feed pawl, change-over means having an operating member and operable by the operating member to change over the film feed speed of the drive means between a first, a second and a third condition, and means for restraining the change-over means in each of the three conditions. The change-over means is further capable of changing over the film feed pawl drive means to a fourth condition which is discrete from but functionally identical with the second condition. The feed device is further provided with means to bias the change-over means from the fourth condition to the third condition.

4 Claims, 4 Drawing Figures

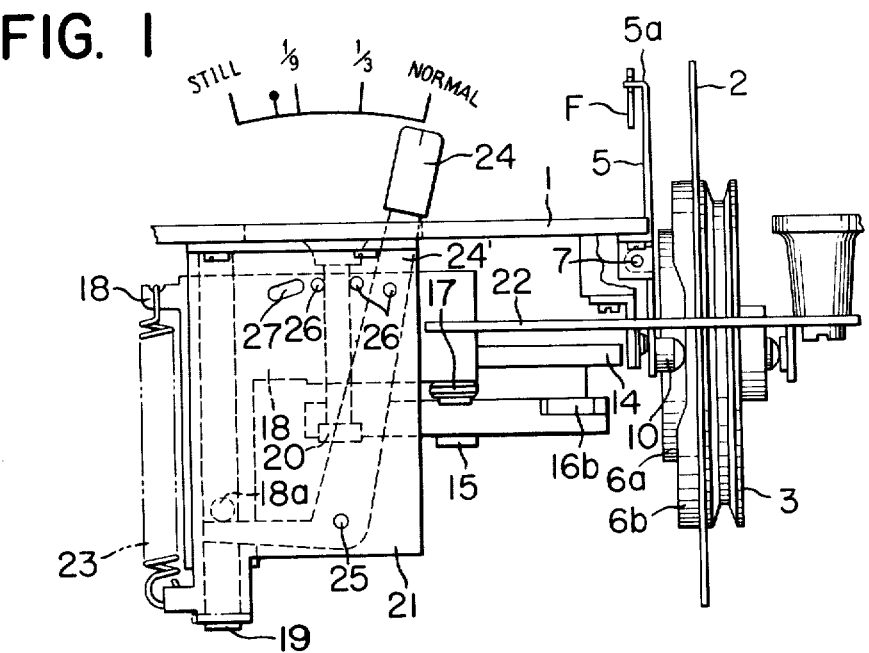
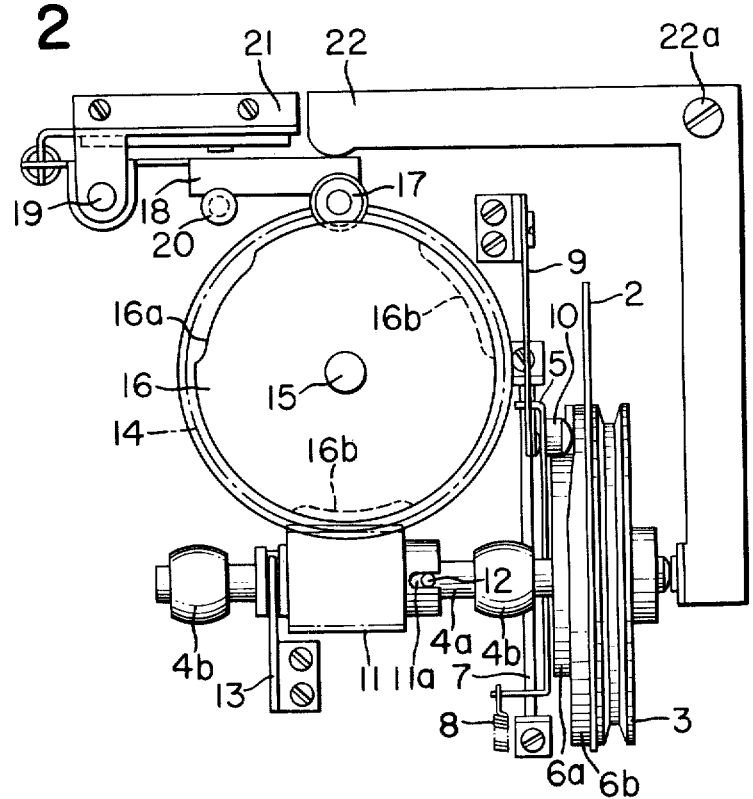

FILM FRAME FEED DEVICE IN A COMPACT MOTION PICTURE PROJECTOR

BACKGROUND OF THE INVENTION

1. Field of the Invention

This invention relates to a film frame feed device in a compact motion picture projector.

2. Description of the Prior Art

In compact motion picture projectors, there have been proposed various types of devices which permit the feeding of the film frame-by-frame, i.e., one frame at a time, as desired. There have also been proposed various types of devices which permit selection of normal speed, slow motion and still projection.

SUMMARY OF THE INVENTION

By the present invention, I provide, in a compact motion picture projector of the described type, a film frame feed device which permits selection of normal speed, slow motion and still projection as well as single frame feed to be simply accomplished by operation of a single manual operating member.

According to the present invention, the film frame feed device comprises a film feed pawl, film feed pawl drive means for imparting a rectangular movement to the film feed pawl so as to cause the pawl to feed a film intermittently, changeover means having an operating member and operable by the operating member to change over the film feed speed of the drive means between a first condition under which the film feed pawl feeds the film at a predetermined rate, a second condition under which the film feed pawl feeds the film at a rate equal to the first-named rate multiplied by an integer, and a third condition under which the film feed pawl is disabled to effect film feed, and means for restraining the change-over means in each of the three conditions. The change-over means is further capable of changing over the film feed pawl drive means to a fourth condition discrete from the second condition but under which the film feed pawl feeds the film at the same rate as that in the second condition. Means are provided to bias the change-over means from the fourth condition to the third condition. Thus, the change-over means may be automatically changed over from the fourth condition to the third condition. The first-named rate may be about eighteen frames per second.

The operating position of the operating member for effecting the change-over to the fourth condition lies between the operating position for effecting the change-over to the second condition and the operating position for effecting the change-over to the third condition.

The restraining means may include a steel ball held by the operating member of the change-over means, and a support plate secured to the body of the device. The support plate is formed with a first and a second hole for engagement with the steel ball during each of the first and second conditions of the change-over means, and a slot for engagement with the steel ball within a range including the third and fourth conditions.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings forming a part of the specification wherein:

FIG. 1 is a plan view of the device according to an embodiment of the present invention;

FIG. 2 is a front elevational view of the same device;

DESCRIPTION OF THE PREFERRED EMBODIMENTS

Figure 3:
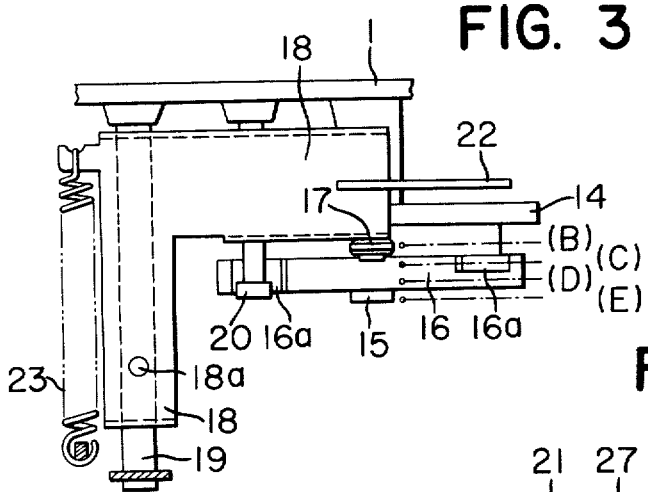
FIG. 3 is a plan view of the change-over portion in the above embodiment.

Referring to FIGS. 1 and 2, there is shown a motion picture projector body 1, a shutter 2 having three openings and a length of film F. A pulley 3 is arranged to be rotated at a speed of about 18 r.p.s. from a motor, not shown. A shutter shaft 4a is slidably received in bearings 4b, and a plate cam 6a and a face cam 6b are formed integrally with each other and are secured to the shutter shaft 4a. A guide bar 7 is secured to the projector body 1 and serves to guide movement of a film feed pawl 5 in the film feeding direction, and movement of a tang 5a formed on an end of the pawl into the film perforations. A helical spring 8 is provided below the film feed pawl 5 to bias the same and a plate spring 9 is secured to the body 1 and biases the film feed pawl 5 toward the face cam 6b. A pin 10 is studded in the film feed pawl 5, as shown, and the film feed pawl is designed to effect the so-called rectangular movement to accomplish single-frame feed, the rectangular movement comprising a combination of a movement in the film feeding direction imparted by the stroke of the plate cam 6a for one full rotation of the shutter shaft 4a and movements into and out of the film perforation imparted by the stroke of the face cam 6b.

A screw gear 11 is formed with a slot 11a adapted to receive a pin 12 studded in the shutter shaft 4a so that the screw gear is rotatable with the shutter shaft. A restraining member 13 is provided to restrain the screw shaft 11 from moving in the thrust direction and a helical gear 14 meshes with the screw gear 11 at a gear ratio of 1:9.

A plate cam 16 is formed integrally with the helical gear 14 and has its rotary shaft common with the shaft 15 of the helical gear. The plate cam 16 has equally spaced recesses 16a and 16b, 16b' formed peripherally thereof as shown in FIG. 2. Two of these recesses, 16b and 16b', are formed with their axial length or depth extending substantially half of the thickness of the periphery of the cam plate 16, as can be seen from FIGS. 1 and 2, and the other recess 16a is formed with its axial length or depth extending through the entire thickness of the periphery of the cam plate 16, as can be seen from FIGS. 2 and 3.

A roller 17 is journalled to a change-over member 18, which in turn is slidably and rotatably held on a shaft 19. A pin 20 with an enlarged head is studded in the body 1. The change-over member 18 is arranged to ride on the thicker portion of the pin 20 when the member 18 has been moved to bring the roller 17 to a position (E) in FIG. 3, i.e., when the roller has come to a position off the end surface of the peripheral portion of the cam plate 16. A pin 18a is studded in the change-over member 18 and the roller 17, the change-over member 18 and the pin 18a together constitute a change-over portion.

The change-over portion will particularly be described with reference to FIG. 3. When in the position shown, the change-over portion receives a force directed toward the plane of the drawing sheet from a later-described line 22 which receives the action of the plate spring 9 through the film feed pawl 5, pin 10 and pulley 3, so that the change-over member 18 is engaged with the thinner portion of the pin 20. When this occurs, the roller 17 assumes a position (B) in which it is axially spaced from the cam 16.

Next, when the roller 17 has been moved to a position (C), the roller 17 is engageable with any of the three recesses 16a, 16b, 16b' on the periphery of the cam 16. When the roller 17 has further been moved to a position (D), it is engageable only with the recess 16a. When the roller 17 has come to the position (E), it is again disengaged from the cam 16 to cause the change-over member 18 to ride on the thicker portion of the pin 20.

Turning back to FIGS. 1 and 2, a support plate 21 is secured to the body 1. The link 22 is rotatably supported to the body 1 by a shaft 22a. One end of the link 22 engages the change-over member 18 forming part of the change-over portion, and the other end of the link 22 engages the right end of the shutter shaft 4a. Since the shutter shaft 4a is normally biased to the right, as viewed, under the action of the spring 9, the spring force is transmitted to the change-over member 18 to urge the change-over member 18 against the pin 20 and the engaging force of the roller 17 against the cam 16. A spring 23 has one end hooked on the left end of the change-over member 18 of the change-over portion and the other end secured to the body 1, so as normally to bias the change-over member 18 downwardly as viewed in FIGS. 1 or 3. An operating member 24 is supported for pivotal movement relative to the support plate 21 by a shaft 25 and the support plate 21 is formed with through-holes 26 which provide a click stop means for the operating member 24. The support plate 21 is also formed with a slot 27, and the restraining force of the click stop is weakened within the range of such slot. The construction of the click stop is shown in FIG. 4.

Figure 4:
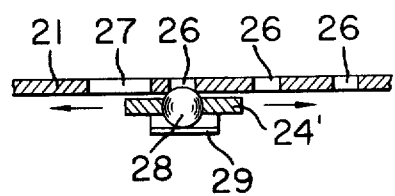
FIG. 4 is a cross-sectional view showing the construction of the click stop in the apparatus.

Thus, in FIG. 4, a steel ball 28 is engaged and held in a through-hole formed in the shank portion 24' of the operating member 24. A plate spring 29 is provided to urge the steel ball 28 against the support plate 21. With the aid of the click stop, the operating member 24 may limit the position of the change-over portion against the force of the spring 23.

Thus, when the operating member 24 is in the position shown, the change-over portion is limited to the position of FIG. 3. The link 22 is stationary in the position of FIG. 2 so as to permit the film feed pawl 5 to effect a single-frame feed movement during one full rotation of the shutter. This is the normal projecting condition under which film feed occurs at a rate of about 18 frames per second.

Next, when the operating member 24 is brought to a position 1/3 indicated on the dial in FIG. 2, the roller 17 of the change-over portion is moved to the position (C) in FIG. 3 by the force of the spring 23 as soon as either recess 16a or 16b in the cam 16 approaches the roller 17. In this case, if the roller 17 was engaged with any other portion than those recesses of the cam 16, the shutter shaft 4a would be moved to the left, as viewed, by the link 22 and the end 5a of the film feed pawl 5 would be spaced apart from the film F irrespective of the position of the face cam 6b, thus effecting no film feed. In the present case, the film F is fed by one frame for three full rotations of the shutter 2, which means a film feed rate of six frames per second.

Next, when the operating member 24 is moved to the position 1/9 indicated on the dial in FIG. 1, the roller 17 comes to the position (D) in FIG. 3 while the roller is not in engagement with either recess 16b of the cam 16. In such case, film is fed by one frame for nine full rotations of the shutter 2, which means a film feed rate of two frames per second. When the operating member 24 is further moved to a position STILL, the roller 17 is moved to the position (E) in FIG. 3 while the roller is not in engagement with the recess 16a of the cam 16, and at the same time, the change-over member 18 rides on the head portion (thicker portion) of the pin 20. As a result, the shutter shaft 4a is moved to the left, as viewed, by the link 22 to bring the film feed pawl 5 to a position in which the pawl is normally disengaged from the film F, thus permitting a still projection to occur.

Description will now be made of the operation for single-frame feed. After the operating member 24 has been brought to the aforesaid STILL position, the operating member is moved back to a black-spot position intermediate the STILL and the 1/9 position. The steel ball 28 forming the click stop mechanism comes to the right end of the slot 27 shown in FIG. 4. Simultaneously therewith, the change-over portion is moved to a position intermediate the positions (D) and (E), which position is functionally equivalent to the position (D). Thus, film feed may occur at a rate of two frames per second, but when the operator releases the operating member 24 upon confirmation of one frame having been fed, the operating member 24 with the change-over portion is returned to the STILL position by the spring 23 because the restraining force of the click stop is now weakened, and thus there is provided a still projecting condition which permits single-frame feed to occur.

Since the aforementioned movement of the operating member to the black-spot position is the movement to the terminus of the slot 27 of the click stop, it is impossible for the operator to inadvertently move the operating member 24 past the black-spot position. Also, if the operating member 24 is moved from the normal projecting position directly to the STILL position without being stopped at any intermediate position such as 1/9 or other, the still projection may be provided on the spot.

Although the present invention has been shown with respect to a change-over mechanism for three projecting positions, normal projection, slow motion projection and still projection, the invention is not restricted to such embodiment but is applicable to any conventional change-over mechanism to obtain the same effect.

From the foregoing description, it will be seen that, by means of the present invenion, normal, slow motion and still projection can be achieved by operation of a single operating member 24 and moreover, single-frame feed projection can readily be effected through a very simple operation.

I believe that the construction and operation of my novel film frame feed device will be understood and that the advantages thereof will be fully appreciated by those persons skilled in the art.

I claim:

1. A film frame feed device for a compact motion picture projector, comprising:
   a film feed pawl;
   film feed pawl drive means for imparting a rectangular movement to said film feed pawl so as to cause said pawl to feed a film intermittently;
   an operating member;
   change-over means operable by said operating member to change over the film feed speed of said drive means between a first condition under which said film feed pawl feeds the film at a predetermined rate, a second condition under which said film feed pawl feeds the film at a rate equal to said first-named cycle multiplied by an integer, and a third condition under which said film feed pawl is disabled to effect film feed;
   means for restraining said change-over means in each of said three conditions;
   means associated with said change-over means for rendering same capable of changing over said film feed pawl drive means to a fourth condition discrete from said second condition but under which said film feed pawl feeds the film at the same rate as that in said second condition; and
   means biasing said change-over means from said fourth condition to said third condition;
   whereby said change-over means may be automatically changed over from said fourth condition to said third condition.

2. A film frame feed device according to claim 1, wherein the operating position of said operating member for effecting the change-over to said fourth condition lies between its operating position for effecting the change-over to said second condition and the operating position for effecting the change-over to said third condition.

3. A film frame feed device according to claim 1, wherein said restraining means includes a steel ball held by said operating member of said change-over means, and a support plate secured to the body of said device and formed with a first and a second hole for engagement with said steel ball held by said operating member during each of said first and second conditions of said change-over means and a slot for engagement with said steel ball within a range including said fourth and third conditions.

4. A film frame feed device according to claim 3, wherein the operating position of said operating member for effecting the change-over to said fourth condition lies between its operating position for effecting the change-over to said second condition and the operating position for effecting the change-over to said third condition.

* * * * *

UNITED STATES PATENT OFFICE
CERTIFICATE OF CORRECTION

Patent No. 3,914,036            Dated October 21, 1975

Inventor(s) SHIGEO WAKAHARA

It is certified that error appears in the above-identified patent and that said Letters Patent are hereby corrected as shown below:

```
Column 4, line  7, change '1/3' to -- "1/3" --;
         line 21, change '1/9' to -- "1/9" --;
         line 39, change 'STILL' to -- "STILL" --;
         line 41, change 'STILL' to -- "STILL" --;
same line, change '1/9' to -- "1/9" --;
         line 51, change 'STILL' to -- "STILL" --;
         line 63, change 'STILL' to -- "STILL" --;
         line 64, change '1/9' to -- "1/9" --.
Column 5, line 30, change "cycle" to -- rate --.
```

Signed and Sealed this fifteenth Day of June 1976

[SEAL]

Attest:

RUTH C. MASON
*Attesting Officer*

C. MARSHALL DANN
*Commissioner of Patents and Trademarks*